United States Patent
Demski et al.

(10) Patent No.: US 11,718,225 B2
(45) Date of Patent: Aug. 8, 2023

(54) METHOD OF DETECTING AND COMMUNICATING WORK VEHICLE MOVEMENT OR PATH AND SYSTEM THEREOF

(71) Applicant: DEERE & COMPANY, Moline, IL (US)

(72) Inventors: Nathan R. Demski, Durango, IA (US); Brian M. Huenink, Cedar Grove, WI (US); Eric A. Keen, Manhattan, KS (US)

(73) Assignee: DEERE & COMPANY, Moline, IL (US)

( * ) Notice: Subject to any disclaimer, the term of this patent is extended or adjusted under 35 U.S.C. 154(b) by 228 days.

(21) Appl. No.: 17/193,686

(22) Filed: Mar. 5, 2021

(65) Prior Publication Data
US 2021/0402919 A1     Dec. 30, 2021

Related U.S. Application Data

(60) Provisional application No. 63/046,019, filed on Jun. 30, 2020.

(51) Int. Cl.
*B60Q 1/50* (2006.01)
*B60Q 1/44* (2006.01)
(Continued)

(52) U.S. Cl.
CPC .............. *B60Q 1/50* (2013.01); *A01B 69/008* (2013.01); *B60Q 1/44* (2013.01); *G05D 1/0088* (2013.01);
(Continued)

(58) Field of Classification Search
CPC ... B60Q 1/50; B60Q 1/44; B60Q 1/24; B60Q 9/00; B60Q 1/484; B60Q 2300/23;
(Continued)

(56) References Cited

U.S. PATENT DOCUMENTS 9,845,043 B1 * 12/2017 Webb ................ B60W 50/0098
10,195,980 B2    2/2019 Widdowson et al.
(Continued)

FOREIGN PATENT DOCUMENTS

| DE | 19839881 A1 | 3/2000 |
|---|---|---|
| DE | 102014206801 A1 | 11/2015 |
| DE | 102015104928 A1 | 10/2016 |

OTHER PUBLICATIONS

Demski et al., Implement Recognition Lighting, U.S. Appl. No. 63/017,978, filed Apr. 30, 2020, 88 pages.
(Continued)

*Primary Examiner* — Omeed Alizada
(74) *Attorney, Agent, or Firm* — Taft Stettinius & Hollister LLP; Stephen F. Rost (57) ABSTRACT

An agricultural work vehicle for operating in a field includes a chassis, a cab mounted to the chassis for an operator to control the work vehicle, a controller for controlling operation of the work vehicle, a lighting system of the work vehicle comprising at least one array field light, and a light control module disposed in electrical communication with the controller. The light control module operably controls the at least one array field light. The controller transmits a signal to the light control module indicative of an intended path of travel of the work vehicle. The at least one array field light projects a light emission corresponding to the intended path of travel onto the field at a location visible to the operator while operating the work vehicle.

20 Claims, 6 Drawing Sheets

(51) Int. Cl.
*G05D 1/00* (2006.01)
*G05D 1/02* (2020.01)
*A01B 69/04* (2006.01)

(52) U.S. Cl.
CPC ... *G05D 1/0238* (2013.01); *G05D 2201/0201* (2013.01)

(58) Field of Classification Search
CPC ............ B60Q 2400/50; B60Q 2800/20; A01B 69/008; G05D 1/0088; G05D 1/0238; G05D 2201/0201
See application file for complete search history.

(56) References Cited

U.S. PATENT DOCUMENTS

| | | |
|---|---|---|
| 10,538,195 B2 | 1/2020 | Fritz et al. |
| 2013/0222592 A1* | 8/2013 | Gieseke ........... G08G 1/096708 348/148 |
| 2016/0207443 A1* | 7/2016 | Widdowson ......... B60Q 1/0011 |
| 2017/0253252 A1* | 9/2017 | Donnelly ............. G02B 27/017 |
| 2018/0279539 A1 | 10/2018 | Wagner |
| 2019/0163196 A1* | 5/2019 | Janssen .................. B60Q 1/507 |
| 2021/0307230 A1* | 10/2021 | Ku ......................... B60Q 1/249 |

OTHER PUBLICATIONS

Schott et al., Method for Communication between Two Utility Vehicles, unpublished U.S. Appl. No. 17/155,722, filed Jan. 22, 2021, 11 pages.
German Search Report issued in application No. DE102021204236.8, dated Jan. 27, 2022, 7 pages.

* cited by examiner

METHOD OF DETECTING AND COMMUNICATING WORK VEHICLE MOVEMENT OR PATH AND SYSTEM THEREOF

RELATED APPLICATIONS

This application claims the benefit of U.S. Provisional Patent Application Ser. No. 63/046,019, filed Jun. 30, 2020, the disclosure of which is hereby incorporated by reference in its entirety.

FIELD OF THE DISCLOSURE

The present disclosure relates to a work vehicle, and in particular, to a method of detecting and communicating a movement or path of a work vehicle.

BACKGROUND

Lighting systems on vehicles are well known and perform numerous tasks. In some instances, conventional lighting systems for on-road vehicles may adjust lighting levels on the basis of other vehicles positioned along a similar path. These lighting systems can offer guidance to an operator who is controlling the steering and operation of the vehicle.

In some ways, these conventional lighting systems are being used in off-road vehicles such as agricultural machines, construction or industrial machines, and forestry machines. As technology continues to evolve and is added to these types of machines, additional in-cabin lights and controls are added for operation by the operator. These additional lights and controls can cause an operator to focus more attention on these controls rather than in a field, on an implement, or areas around the machine. The continuous back-and-forth between monitoring the controls and lights within the cab of the machine and the field being operated in can cause fatigue to the operator and possible errors in the field operation.

It is therefore desirable to provide a more operator-friendly method and system of displaying information related to the machine and operation to the operator without causing the operator to continuously monitor displays and the like in the cab of the machine.

SUMMARY

In one embodiment of the present disclosure, an agricultural work vehicle for operating in a field includes a chassis; a cab mounted to the chassis and including a work space for an operator to control the work vehicle; a controller for controlling operation of the work vehicle; a lighting system of the work vehicle comprising at least one array field light; a light control module disposed in electrical communication with the controller, the light control module configured to operably control the at least one array field light; wherein, the controller transmits a signal to the light control module indicative of an intended path of travel of the work vehicle; further wherein, the at least one array field light projects a light emission corresponding to the intended path of travel onto the field at a location visible to the operator while operating the work vehicle.

In another embodiment, a work vehicle for operating in a field includes a chassis having a front end, a rear end, a first side and a second side; a cab mounted to the chassis and including a work space for an operator to control the work vehicle; a controller for controlling operation of the work vehicle; a device for detecting a maximum dimension of the work vehicle, the device being in communication with the controller; a lighting system of the work vehicle comprising at least one array field light; a light control module disposed in electrical communication with the controller, the light control module configured to operably control the at least one array field light; wherein, the controller transmits a signal to the light control module indicative of the maximum dimension; further wherein, the at least one array field light projects a light emission corresponding to the maximum dimension in a direction visible to the operator when positioned in the cab.

In a further embodiment of the present disclosure, an autonomous agricultural work vehicle for operating in a field includes a chassis including a plurality of wheels; a controller for controlling operation of the work vehicle; a lighting system of the work vehicle comprising at least one array field light; a light control module disposed in electrical communication with the controller, the light control module configured to operably control the at least one array field light; wherein, the controller transmits a signal to the light control module indicative of an intended path of travel the work vehicle; further wherein, the at least one array field light projects a light emission corresponding to the intended path of travel at a location at least in front of the work vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 1:
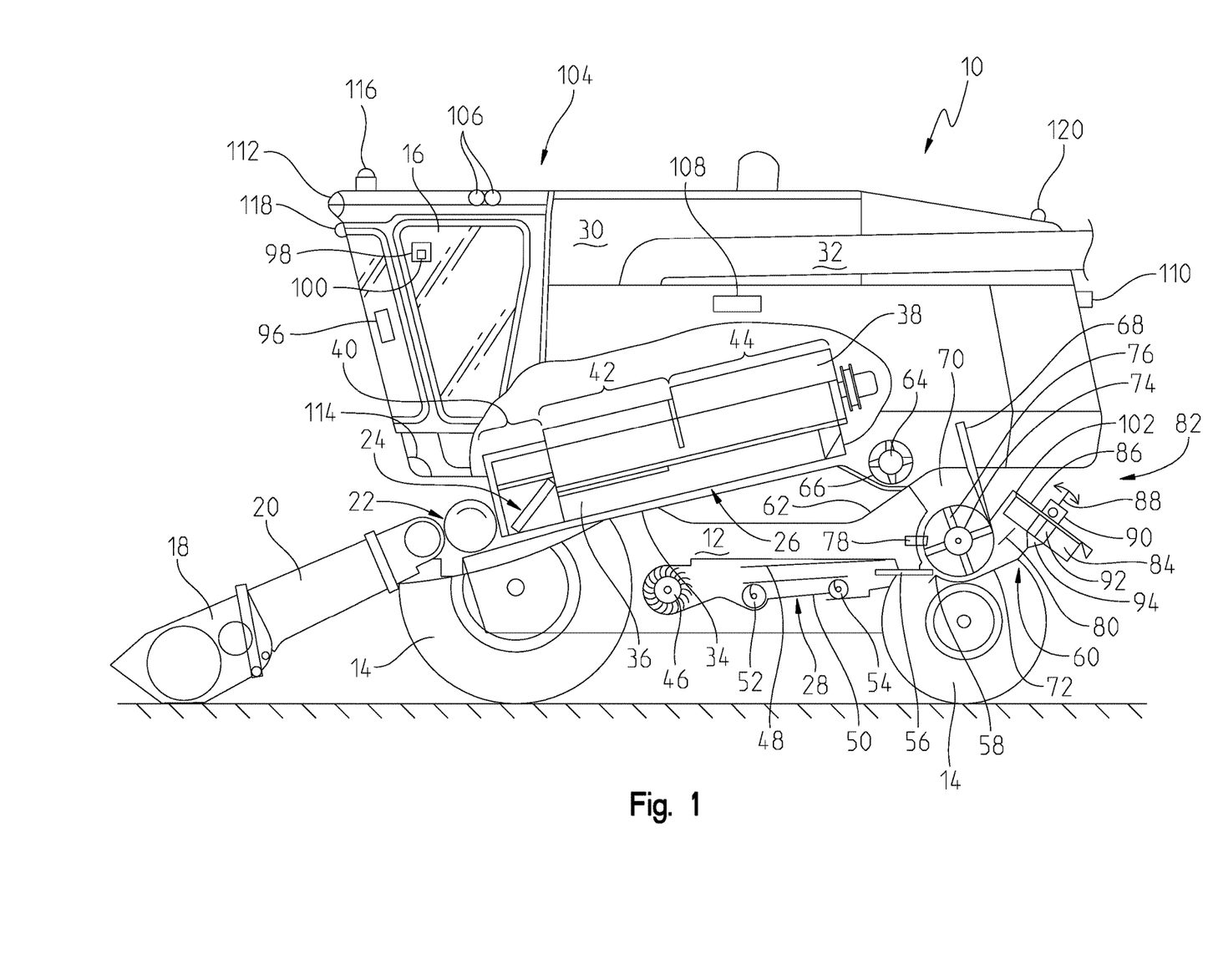
FIG. 1 is a partial section of a side view of an agricultural vehicle with a lighting system according to the present disclosure.

In FIG. 1, an illustrative example is provided of a work machine. In this example, the work machine is depicted as an agricultural vehicle, and in particular, to an agricultural combine 10. The present disclosure, however, is not limited to a combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the embodiment of FIG. 1, an agricultural combine 10 is shown with a chassis 12 with wheels 14 in contact with the ground. Wheels 14 are coupled to the chassis 12 and are used for a forward propulsion of the combine 10 in a forward operating or travelling direction. The forward operating direction is to the left in FIG. 1. The operation of the combine 10 is controlled from an operator's cab 16. The operator's cab 16 may include any number of controls including an operator terminal or controls 96 for controlling the operation of the combine 10. A cutter head 18 may form part of an implement attached to the combine 10. Alternatively, the cutter head 18 may form part of the combine and thus is mounted to the chassis 12. In any event, the cutter head 18 may be disposed at a forward end of the combine 10 and is used in order to harvest crop such as corn and to conduct it to a slope conveyor 20. The harvested crop is conducted by a guide drum 22 to a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Corn and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean corn over a screw conveyor 52 to an elevator for clean corn (not shown). The elevator for clean corn deposits the clean corn in a corn tank 30, as shown in FIG. 1. The clean corn in the corn tank 30 can be unloaded by an unloading screw conveyor 32 to a corn wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the combine and to the chopper rotor assembly 60. The blower 46 is capable of providing three or more air paths inside the combine. A first air or flow path may be through a front portion of the combine 10. A second air or flow path may be above the lower sieve 50 and below the upper sieve 48 or chaffer. A third air or flow path may be below the lower sieve 50. All three air or flow paths fill the combine body and can create pressurized air flow to pick up and carry straw, grain, and other residue or particles to the rear of the combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath it to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on its end facing away from the disk 86. The impeller blades 84 may be rectangular and the height of the body 92 (without cone 94) may be equal to the height of the impeller blades 84. The cross section of the body 92 and the cone 94 may be circular, although it could also have a multifaceted shape.

In FIG. 1, the agricultural vehicle 10 may include a lighting module or system 104 which is an integral part of the vehicle. The lighting module or system 104 may utilize a high-definition (HD) pixel or pixel light-emitting diode (LED) light array module. The system 104 may include its own control module 224 (see FIG. 2). The light system control module or controller 224 may be operably disposed in electrical communication with a vehicle controller 222, which controls the operation of the vehicle 10. The vehicle controller 222 may send communications or signals to the control module 224 for controlling the lighting system 104.

With matrix lighting, a vehicle controller may use a high beam and a low beam to illuminate the vehicle surroundings. With matrix lighting control, the controller may turn off the high beam and create a darkened column in the area where an oncoming vehicle or object is so as to not blind the vehicle (or person). With HD LED or HD Pixel source LED illumination, pixel technology is utilized in which more focused areas can be illuminated or de-illuminated based on need. Rather than using a single bulb, for example, the lighting system of the present disclosure may control individual pixels or pixel segments to project or illuminate. Individual segments may include between a thousand to over a million pixels, and the lighting system controller or control module 224 may operably enable or disable individual segments during operation. Moreover, the control module 224 may vary the intensity of the individual segments to project information or other communications onto the field as will be described below with reference to FIGS. 3 and 4.

The lighting system may be formed by an ambient or working lighting of the vehicle or an illumination provided inside the cab 16 in the form of illuminatable control and display elements or interior lighting. The working lighting may include a plurality of field lights mounted to the vehicle at different locations. In one example, each of the plurality of field lights may comprise a LED array field light. Other technology besides LED may be used for the field lights. The plurality of field lights may include a first field light 106, a second field light 108, a third field light 110, a fourth field light 112, and a fifth field light 114. In other embodiments, there may be additional or fewer field lights. In other words, there can be any number of field lights mounted to the chassis 12, cab 16, cutter head 18, etc. In the illustrated example of FIG. 1, the first field light 106 may be mounted to a roof of the cab 16. The second field light 108 may be mounted to each side or only one side of the vehicle 10. The third field light 110 may be mounted to the rear of the chassis 12. The fourth field light 112 may be mounted to a front portion of the roof of the cab 16, and the fifth field light 114 may be mounted to a front deflector or portion of the chassis 12 below the cab 16. The location of each field light may differ on other vehicles or machines, and thus the example of FIG. 1 is only intended to illustrate an example of one lighting system 104.

The plurality of field lights may enable an aerial or overlapping illumination of a terrain or field surface surrounding the agricultural vehicle 10. One or more of the field lights can be activated individually and varied in terms of their luminous intensity by the vehicle controller 222 for adapting the emission characteristic or light intensity.

In addition to the actual lamp (Halogen or gas discharge lamp, LEDs or the like), one or more of the plurality of field lights may have optical devices for changing the emission characteristic, and consequently, the emission angle or the emission angle-dependent light distribution. The optical devices can be formed either by electrically controllable optical systems (collimators or lens systems), or else by the lamp itself. In the latter case, this may include a segmented LED matrix, in which individual matrix segments can be switched on and off and varied in their luminosity by the controller 222.

Inside the cab 16 may include a camera 100 for optically detecting the position or head posture of a vehicle operator. The information obtained by the camera 100 may be fed to the controller 222 to determine the instantaneous viewing direction of the vehicle operator using image processing software. The camera 100 may be integrated in a rear-view mirror or a housing 98, for example, covered by the rear-view mirror.

Figure 2:
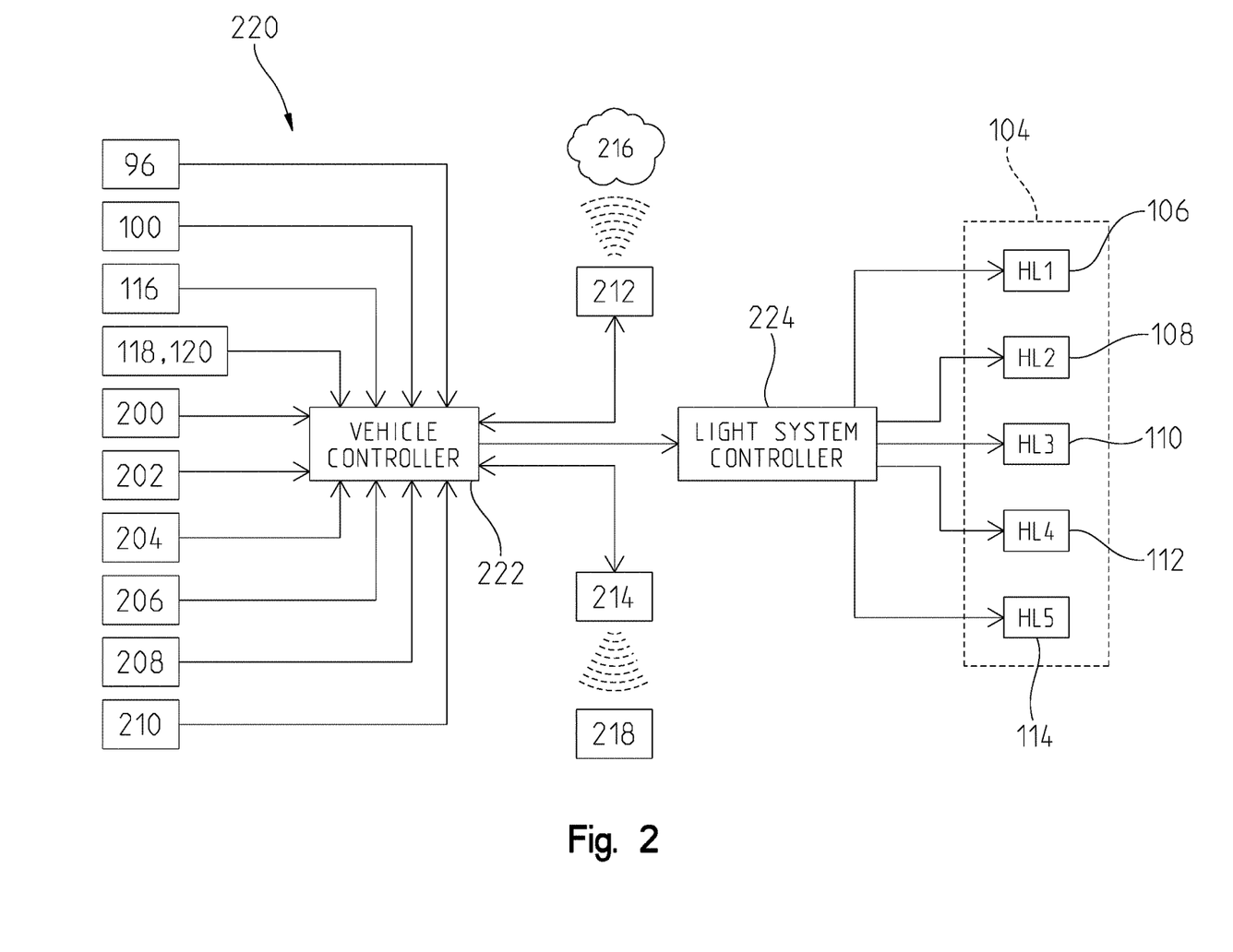
FIG. 2 is a schematic of a control system of the vehicle and lighting system of FIG. 1.

As shown in FIG. 2, the vehicle controller 222 may form part of a vehicle control system 220. Here, the controller 222 may include a data interface 212 for the wireless reception of position or other information broadcast by another work machine or vehicle (not shown). The position information broadcast by the other vehicle may be located in a data cloud 216 and can be retrieved from there via the data interface 212 using an existing wireless network.

On the basis of the position information received, the controller 222 can determine a relative position of the agricultural vehicle 10 with respect to the other vehicle, for which purpose the controller 222 performs a comparison with position information in relation to the vehicle 10. The assessment or determination of the relative position may be carried out on the basis of a polar coordinate system, in which the vehicle 10 forms the origin of the coordinate system.

The position information related to the vehicle 10 may be captured by a satellite-based navigation system. The satellite-based navigation system can be either installed in the vehicle 10 or else implemented as a wireless device 218. The latter may be a component part of a mobile telephone of the vehicle operator, wherein the calculated position information is transmitted wirelessly to the controller 222 via an LTE connection established by a wireless interface 214.

In addition, in order to determine potential extraneous light effects, the controller 222 may be connected to an ambient-sensing light or image sensor. The light or image sensor may be a panorama or 360-degree camera 116 arranged in the roof area of the cab 16. Alternatively, it can also be light-sensitive sensor elements or individual cameras (not shown), distributed along an outer side of the vehicle 10.

Besides the lighting system 104 and cameras, the agricultural vehicle 10 may include one or more sensors for detecting a relative position of the vehicle to another object. For example, a first proximity sensor 118 may be mounted to the front side of the vehicle 10 and a second proximity sensor 120 may be mounted to the rear side thereof. Each sensor may be in electrical communication with the controller 222, as shown in FIG. 2. The first sensor 118 may detect an object in front of the vehicle as it travels in a forward direction, whereas the second sensor 120 may detect an object either approaching from behind or an object in the path of rearward movement of the vehicle 10. The vehicle 10 may include additional sensors for detecting the position of the vehicle relative to surrounding objects and provide corresponding feedback to the controller 222.

The controller 222 may be in a position where it receives data and other feedback from the operator of the vehicle along with sensors, cameras, remote devices, and the like across the vehicle and implement. In the example of FIG. 2, the controller 222 may be arranged to receive a plurality of inputs. For instance, the controller may receive communication from the operator terminal 96 in the form of commands or instructions from the operator. This may include instructions to accelerate, decelerate, or turn the tractor. Alternatively, this may include to active or de-activate the lighting system 104. Further, it may include commands to operate the vehicle according to a desired mode or setting. Other known operator commands may be communicated to the controller 222 via the operator terminal 96.

The controller 222 may also receive images or other communications from the camera 100 located in the cab 16 of the vehicle. The camera may detect movement of the operator and communicate the same to the controller 222. While a camera is depicted in FIG. 1, the camera 100 may also comprise a sensor for detecting a characteristic of the vehicle from inside the cab 16.

The controller 222 may further receive communication from the camera 116 located externally of the cab 16. Here, the camera 116 may detect environmental conditions such as dusk or dawn, lighting effects from the lighting system 104, along with a view of the area around the work vehicle 10. This may include objects or obstacles in a field, a fence line, a roadway, or other on-road or off-road vehicles in the general area. The camera 116 may provide images to the controller 222, which in turn may communicate these images to the operator as will be described further below.

The controller 222 may be in communication with the first and second proximity sensors 118, 120. The sensors may communicate objects that are within a predefined distance of the vehicle 10. This may include other vehicles in the field or on a roadway during transport.

As shown in FIG. 2, the controller 222 may receive communications from one or more sensors 200 regarding an operating status, operating position, or diagnostic trouble codes (DTCs) related to the vehicle. These sensors 200 may communicate warnings in the form of DTCs to the operator such as, but not limited to, low battery level, low fuel, etc.

The controller 222 may receive communications from a field map input 202 which may include positional information relative to a field. This information may be determined and loaded into a memory unit of the controller 222, or it may be communicated from a remote source. The information from the field map input 202 may include field boundaries, roadways, fence lines, obstacles to avoid, etc. This information may be provided to the controller 222, which can then provide this information to the operator during field operation.

The controller 222 may also be in communication with a global positioning sensor (GPS) input 204. The GPS input 204 may come from a satellite or other remote sensing device (e.g., a cell phone). The GPS input 204 may provide a location of the vehicle 10 to the operator so that the operator is able to determine where in the field the vehicle is located.

A vehicle speed input 206 may provide vehicle speed to the controller 222. An operation mode type input 208 may provide the operator with details related to what type of operating mode a towed implement or the cutter head 18 is in. For an agricultural sprayer, for example, the operation mode type input 208 may signal when a sprayer boom of the sprayer is folded, which is indicative of a transport mode, or unfolded, which is indicative of a field or working mode.

Other sensors 210 may be in communication with the controller 222 to provide performance data or information about the vehicle or implement. This performance data or information may include any data that is generally collected, monitored, displayed, calculated, etc. and provided to the operator to better control the operation of the vehicle or implement.

In conventional control systems, data and other information about the vehicle and/or implement may be presented to the operator on a display, dashboard, or other manner. In some cases, data may be displayed on a heads-up display (HUD) module on a glass window of the cab. In other instances, the operator may have to select between different screens in order to see certain data or information about the vehicle or implement. While HUD modules can allow an operator to maintain a forward-facing position, there are limitations to HUD modules. In some instances, data displayed via a HUD module can be distracting and cause an operator to lose focus on the field or implement being used.

Figure 3:
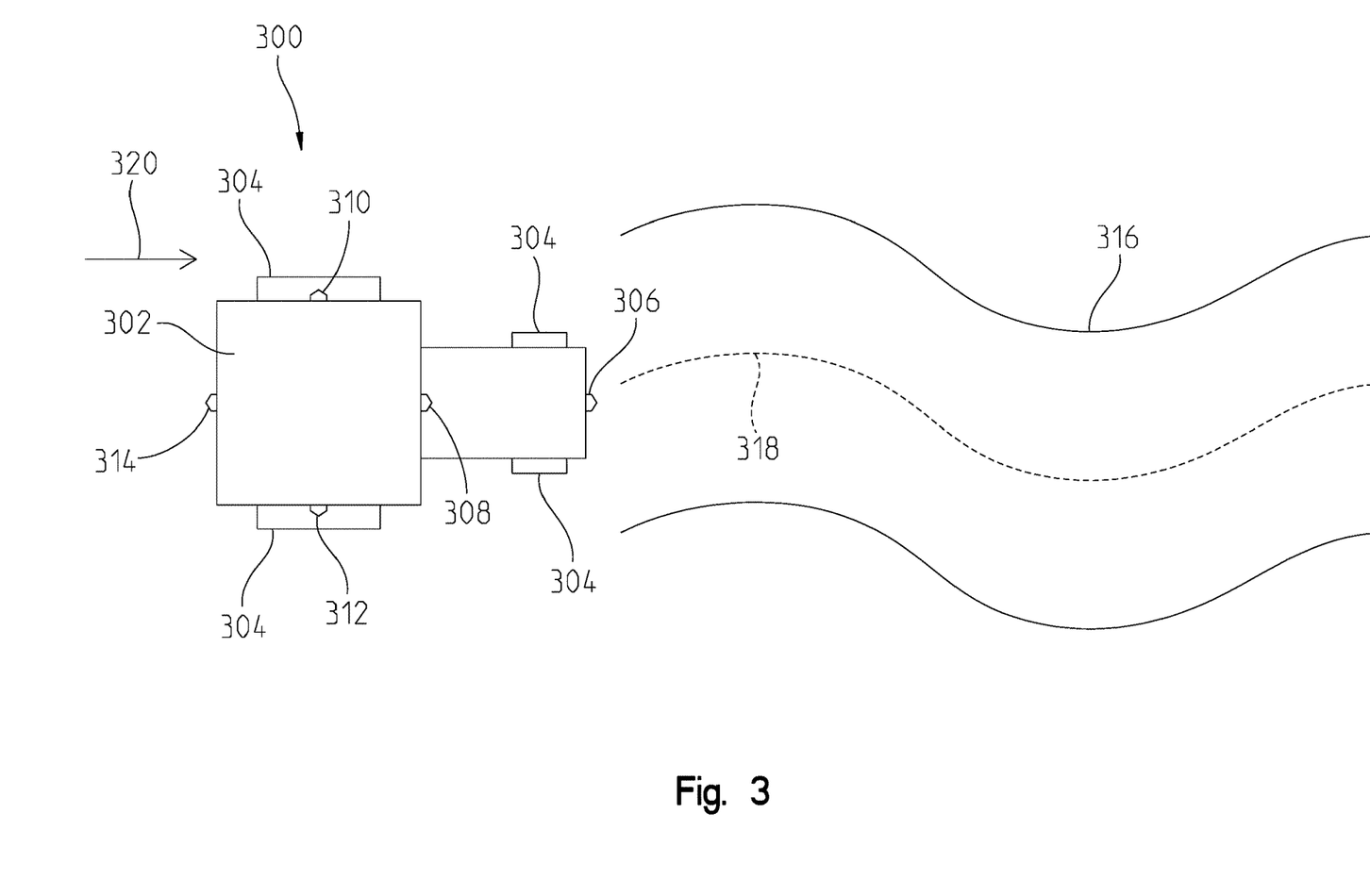
FIG. 3 is a schematic of an agricultural vehicle with a lighting system for communicating an intended path.

In order to overcome these distractions and allow the operator to maintain focus during vehicle or implement operation, the present disclosure provides a different manner for displaying information to the operator. In FIG. 3, an example of the work vehicle 300 is shown. Here, the work vehicle 300 may be a combine, harvester, tractor, or the like. More generally, the vehicle 300 may include any off-road vehicle in the agricultural, construction, or forestry industries.

In any event, the work vehicle 300 in FIG. 3 is shown travelling in a forward work direction 320 along a field, road or path 316. The vehicle 300 may include a cab 302 where an operator is stationed for controlling the vehicle 300 and a plurality of wheels 304. The cab 302 may include a similar control system to that shown in FIG. 2. The control system, for example, may include an operator interface 96, a camera 100, and other sensors, etc. The vehicle 300 also may include the lighting system 104 described above, including a first array field light 306, a second array field light 308, a third array field light 310, a fourth array field light 312, and a fifth array field light 314, as shown in FIG. 3. The first array field light 306 may be located at a forwardmost end of the vehicle 300. The second array field light 308 may be located on the cab 302, whereas the third and fourth array field lights 310, 312 may be located on each side of the vehicle 300. The fifth array field light 314 may be located on a rear of the cab 302 or vehicle 300.

In a conventional off-road vehicle, the size of work vehicles and implements continues to expand as well as the utilization of both in dim light conditions. As it gets darker, it can be more difficult for an operator of the vehicle and implement to determine the path of travel of the vehicle with conventional lighting. As a result, many vehicles are unable to operate at dusk or later due to the low visibility of the surroundings. This is particularly true when operating in a field where there is a desired path for the vehicle to take.

In FIG. 3, an embodiment of the work vehicle 300 is shown in which the operator is controlling the vehicle 300 along a path 316 defined by a road or other course of travel. To better assist the operator in controlling the work vehicle 300, the lighting system 104 of the work vehicle may be used to illuminate or project an intended path of travel 318. In one example, the first array field light 306 may comprise high-definition LED pixel technology to project an A-B line in the field to illustrate to the operator where to steer the vehicle 300. The first array field light may be a red, blue, and green (RGB) array field light.

As shown in FIG. 3, the first array field light 306 may project in the forward travel direction 320 a line 318 that corresponds to a desired travel path. This desired travel path may correspond with the GPS input 204 of FIG. 2. Alternatively, the desired travel path may be from the field map input 202. Further, the desired travel path may be communicated to the controller 222 via the wireless interface 214.

In any event, the controller 222 may determine the desired or intended travel path and communicate the same to the light control module 224. For instance, an operator may use a steering wheel, joystick, or other operator control to control the vehicle movement. Upon doing so, the light control module 224 may operably control the first array field light 306 to project the intended path of travel 318 for the work vehicle 300 to follow. In one example, the control module 224 of the lighting system 104 may receive the communications from the controller 222 and operably control individual pixel segments to project or display the intended path of travel 318 out into the field ahead of the work vehicle 300 so that the operator can maintain focus on the field in front of the vehicle 300 or implement (not shown) without turning to displays in the cab or elsewhere to determine what path to follow or other information about the vehicle or implement.

In addition to the intended path of travel 318, the lighting system 104 may also highlight objects along the intended path of travel 318 for the operator to see and avoid when steering the work vehicle 300. In some instances, the controller 222 may communicate to the light control module 224 to deviate from the intended path of travel 318 so that the vehicle 300 avoids a certain object. As soon as the vehicle 300 passes and avoids the object, the controller 222 may communicate to the light control module 224 to return the projected light array onto the field corresponding to the intended path of travel 318.

While the first array field light 306 is described as projecting the intended path of travel 318, this disclosure is not intended to be limited to this. Instead, any of the array field lights may project the intended path of travel 318. Moreover, two or more of the array field lights may be operably controlled by either the controller 222 or light control module 224 to project the intended path of travel 318 in front of the vehicle 300 for the operator to see from the cab 302.

Figure 4:
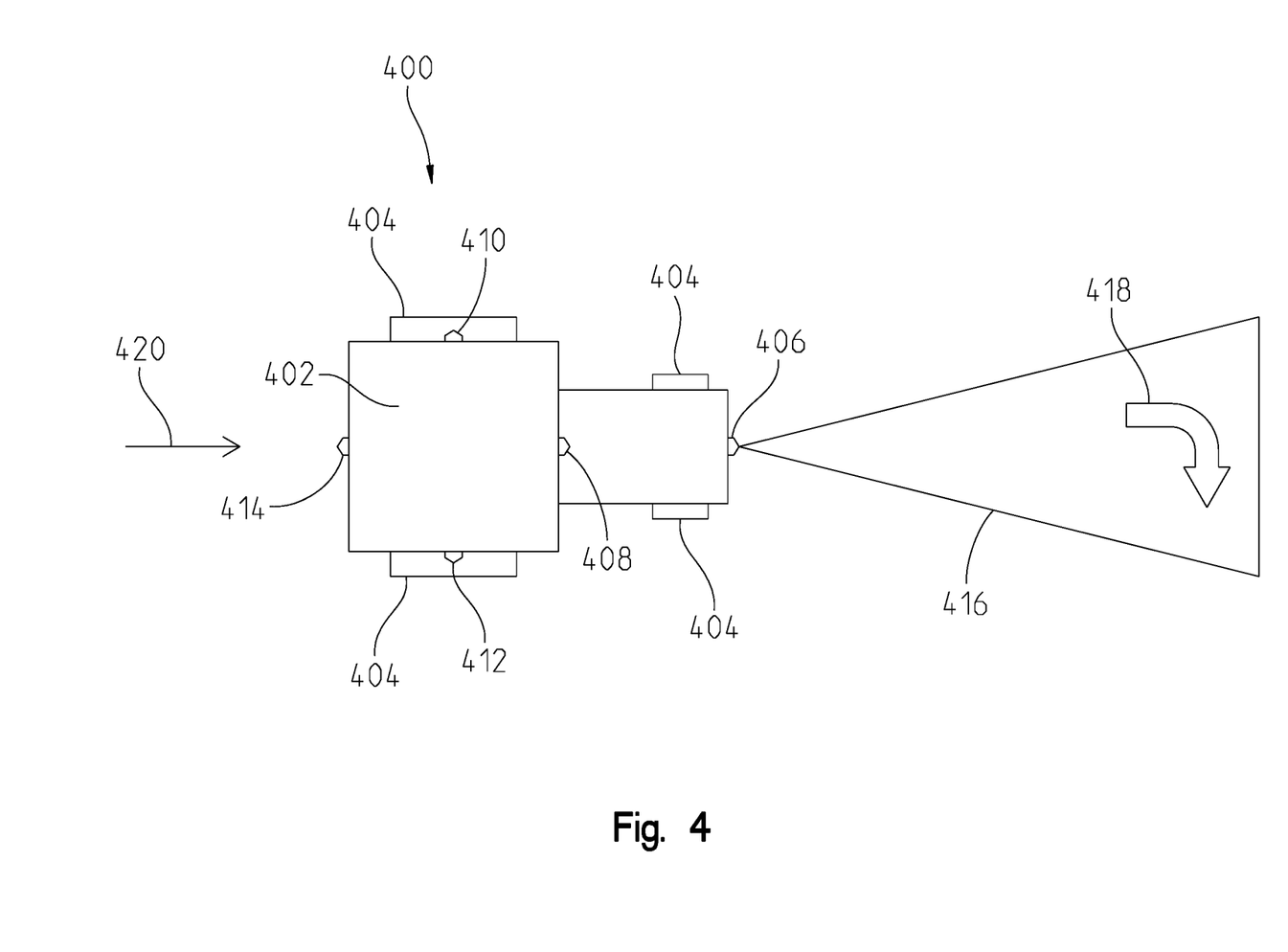
FIG. 4 is a schematic of an agricultural vehicle with a lighting system for communicating a signal regarding intended travel.

Referring to FIG. 4, a different schematic of a work vehicle 400 is illustrated. In this embodiment, the work vehicle 400 may include a cab 402 which is supported on a chassis by a plurality of wheels 404. The work vehicle 400 is shown having a cab 402, but in at least one example, the vehicle may be autonomous and controlled in a field or other without an operator disposed in the cab 402.

The work vehicle 400 may include a lighting system similar to that shown in FIG. 1 and a control system similar to that shown in FIG. 2. In particular, the work vehicle 400 may include a first array field light 406, a second array field light 408, a third array field light 410, a fourth array field light 412, and a fifth array field light 414, as shown in FIG. 4. The first array field light 406 may be located at a forwardmost end of the vehicle 400. The second array field light 408 may be located on the cab 402, whereas the third and fourth array field lights 410, 412 may be located on each side of the vehicle 400. The fifth array field light 414 may be located on a rear of the cab 402 or vehicle 400.

As a work vehicle operates, it is often difficult for someone outside of the cab to know which direction the vehicle will turn, how fast the vehicle may accelerate, or if the vehicle is about to brake. While many on-road vehicles utilize a turn signal or brake light, at least with a turn signal the operator must manually actuate a lever or other control to communicate the intention of turning the vehicle. As an on-road vehicle accelerates, there is generally no visible communication to those around the vehicle that the vehicle is intending to accelerate. Even with turn signals and brake lights, the lights may not be visible to a person or driver of another vehicle at all locations around the vehicle. Thus, it may be difficult for those around the work vehicle to know the intentions of the vehicle during operation.

To overcome these disadvantages and offer a better method for communicating the intention of vehicle movement and path, the controller 222 of the vehicle 400 may communicate to the light control module 224 a desired travel path. This desired travel path may include a turn, an acceleration, a deceleration, or the like. In turn, the light control module 224 may operably control one of the array field lights to project a light emission 416, as shown. The light emission 416 may include a symbol or color to communicate to those around the vehicle 400 what the intended operation of the vehicle is forthcoming. In FIG. 4, the light emission 416 from the first array field light 406 includes a turn symbol 418 displayed on the ground in a direction of forward travel 420 so that those around the vehicle know that the vehicle 400 is about to turn right. A similar emission with a symbol may be projected from the second array field light 408, the third array field light 410, the fourth array field light 412, and/or the fourth array field light 414.

In one example, if the work vehicle 400 is accelerating, the controller 222 may detect this via a communication with an accelerator pedal or from a sensor that detects the acceleration in vehicle speed. Any known way of detecting acceleration may be used for communicating the intention of accelerating the vehicle to the controller 222. Upon detecting the acceleration, the controller 222 may communicate the same to the light control module 224, which may operably control a certain response signal using one or more of the array field lights. For instance, one or more of the array field lights may emit a continuous or blinking green color to alert those around the vehicle of the acceleration. In the event the vehicle is braking, the one or more array field lights may be operably controlled to emit a continuous or blinking yellow color. If the vehicle 400 comes to a stop, the one or more array field lights may emit a continuous or blinking red color.

In the event the vehicle is going to continue travelling in a straight direction, the light control module 224 may continuously control each of the array field lights to emit an arrow or the like indicative of the travel direction. Other symbols or lights may be used to communicate the intended travel path of the vehicle 400. Moreover, an audible signal may be projected from the vehicle 400 to alert those around the vehicle 400 about a forthcoming change in travel path.

Although not shown in FIG. 4, the work vehicle 400 may tow an implement through a field. The implement may be accompanied with one or more array field lights which are operably controlled by the light control module 224 of FIG. 2 or by a different control module. In any event, the one or more array field lights on the implement may emit a signal (e.g., color, symbol, etc.) to communicate to those around the implement whether the implement is functioning according to a work mode or a transport mode. Other types of communication may be available and used when the work vehicle 400 is towing the implement.

Figure 5:
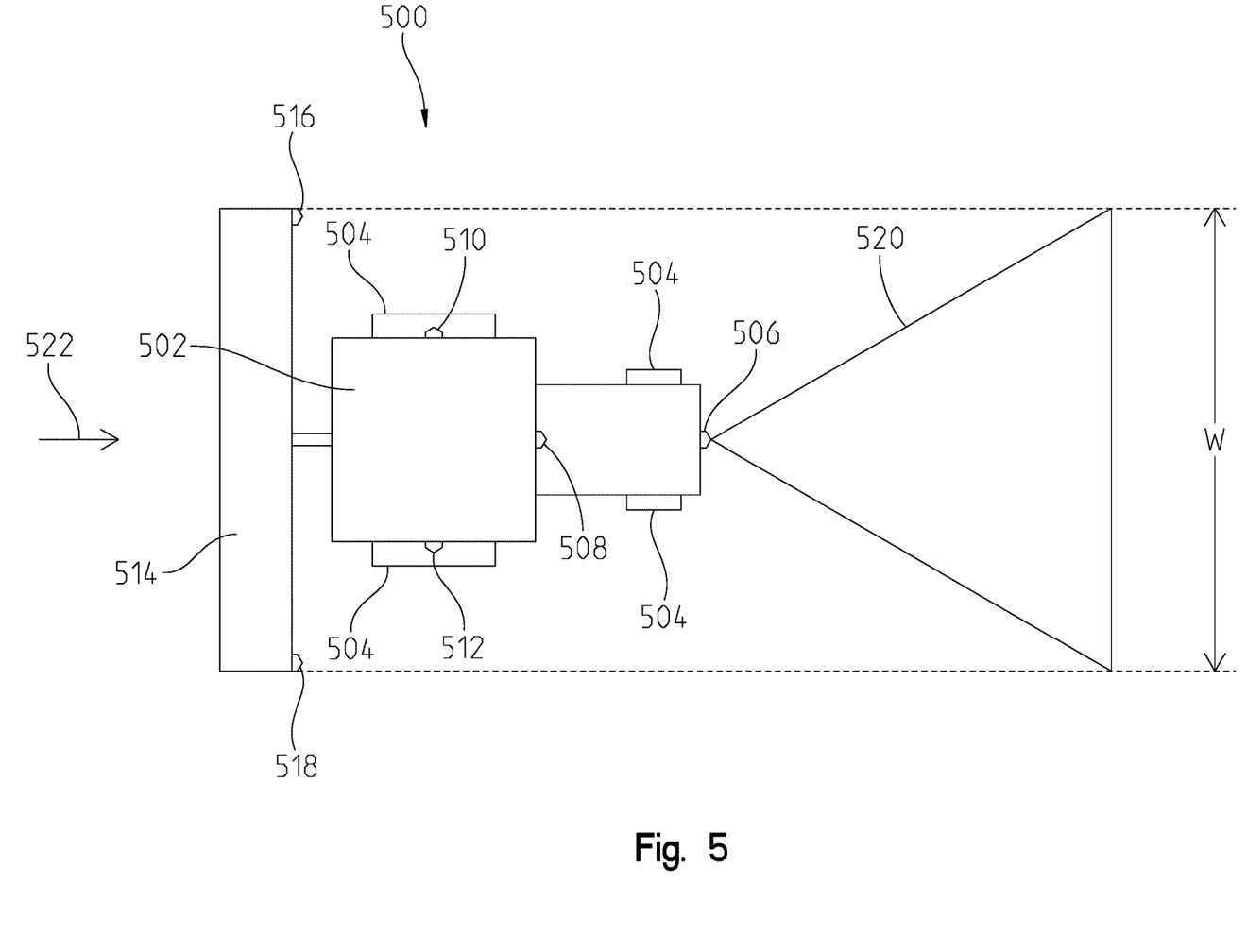
FIG. 5 is a schematic of a combined agricultural vehicle and implement with a lighting system for projecting a width of the combined vehicle and implement during operation.

Referring to FIG. 5, another embodiment of a work vehicle 500 is shown. Here, the work vehicle 500 may include a cab 502 mounted to a chassis or frame of the vehicle 500. A plurality of wheels 504 may support the chassis and cab 502 as the work vehicle 500 travels in a forward travel direction 522. In the embodiment, the work vehicle 500 may include a hitch or drawbar for towing an implement 514. The implement 514 may be for working in a field such as for planting, tilling, etc.

The work vehicle 500 may include a lighting system similar to the one shown in FIG. 1 and a control system similar to that shown in FIG. 2. In particular, the work vehicle 500 may include a first array field light 506, a second array field light 508, a third array field light 510, a fourth array field light 512, and a fifth array field light 514, as shown in FIG. 5. The first array field light 506 may be located at a forwardmost end of the vehicle 500. The second array field light 508 may be located on the cab 502, whereas the third and fourth array field lights 510, 512 may be located on each side of the vehicle 500. The fifth array field light 514 may be located on a rear of the cab 502 or vehicle 500.

The implement 514 may also be configured to include a lighting system. The implement lighting system may include a separate light control module that is in communication with the controller 222. Alternatively, the implement lighting system may be operably controlled by the light control module 224 shown in FIG. 2 and described above. In FIG. 5, the implement lighting system may include a first array field light 516 and a second array field light 518. The implement lighting system may include additional field lights. Alternatively, the implement lighting system may include only one field light. It is also possible that the implement does not include any lighting system in at least one example. In this latter example, the work vehicle lighting system may provide enough illumination to replace a lighting system on the implement.

In the embodiments of FIGS. 3 and 4 above, the lighting system is described as projecting an intended path of travel of the vehicle for both the operator (FIG. 3) and those outside of the vehicle (FIG. 4). While displaying or projecting the intended path of travel is described above, the embodiment of FIG. 5 utilizes the lighting system to project an outer extreme of the work vehicle 500 and/or implement 514. For example, the first array field light 506 is depicted as projecting a light emission 520 having a width, W, corresponding to the outer width of the implement 514. Since in FIG. 5 the implement 514 is shown being wider than the work vehicle 500 (e.g., tractor), the light emission 520 corresponds to the implement width. From this, the operator can better align the implement 514 in a field to achieve optimal efficiency for each row. In other words, the operator may control the implement 514 so that there is minimal overlap between adjacent rows as the implement is towed through the field.

While the first array field light 506 is shown in FIG. 5 as projecting this light emission 520, in other embodiments any of the array field lights on the work vehicle 500 may project the light emission. For instance, the third array field light 510 and fourth array field light 512 may project light emissions corresponding to the outer width of the work vehicle 500. In yet another embodiment, the implement lighting system may project the light emission corresponding to the outer extreme thereof. In this embodiment, the first and second array field lights 516, 518 of the implement 514 may project forward the outer boundary or extreme of the implement 514.

In any of the aforementioned embodiments, the array field lights may project the light emission 520 forward, i.e., in the forward travel direction 522, so that an operator positioned in the cab 502 is able to identify from the light emission 520 the greatest width of the combined vehicle and implement. Thus, if the operator has to control the work vehicle and/or implement through a fence between fields or into a barn for storage, the operator will know the outer extreme of the vehicle or implement to determine if the opening is wide enough.

Although not shown in FIG. 5, a proximity sensor such as the sensors 118, 120 in FIG. 1 or a camera such as the camera 116 of FIG. 1 may be used to detect the outer extreme of the work vehicle 500 or implement 514. The sensors or camera may communicate this to the controller 222, which in turn may communicate the width or outer extreme to the light control module 224. The light control module 224 may then operably control one or more of the array field lights on the work vehicle and/or implement to project the light emission 520 of FIG. 5.

Further, in another embodiment, the actual width of the work vehicle 500 or implement 514 may be known and either manually input by the operator or stored in a memory unit of the controller 222. In this embodiment, sensors or a camera may not be necessary for determining the outer extreme of the work vehicle 500 or implement 514.

Figure 6:
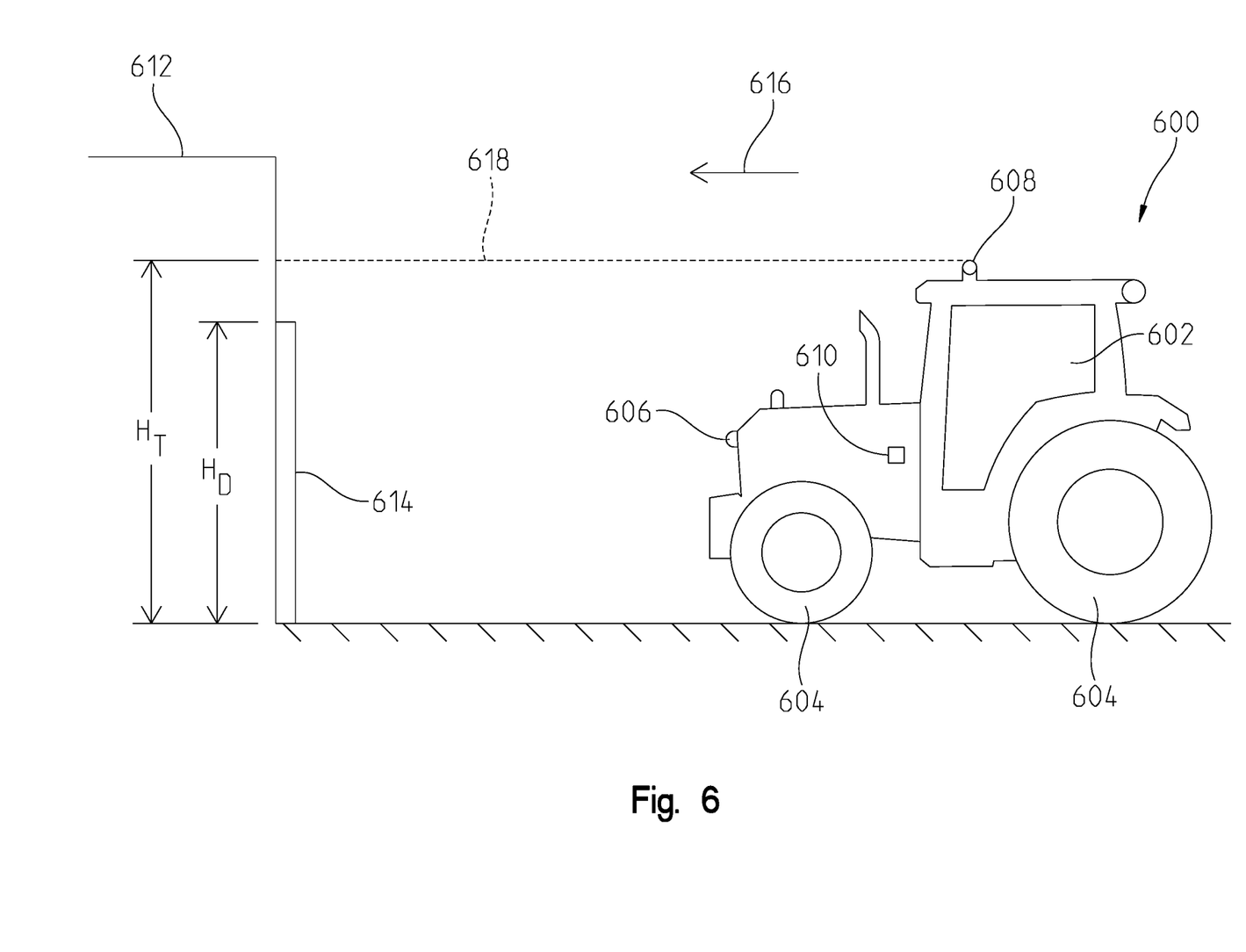
FIG. 6 is a schematic of an agricultural vehicle with a lighting system for projecting a height of the vehicle during operation.

A further embodiment of the present disclosure is illustrated in FIG. 6. In FIG. 5, a lighting system on the work vehicle 500 or implement 514 is utilized to project an outer extreme or width, whereas in FIG. 6 a similar lighting system may be utilized to project a height of the work vehicle or implement. As shown, a work vehicle 600 may include a cab 602 where an operator is positioned for controlling the vehicle. The vehicle 600 may include a chassis or frame which is supported by a plurality of wheels 604. The work vehicle 600 may be controlled in a forward travel direction 616 as shown.

The work vehicle 600 may include a lighting system similar to the one shown in FIG. 1 and a control system similar to that shown in FIG. 2. In particular, the work vehicle 600 may include a plurality of array field lights including a first array field light 606, a second array field light 608, and a third array field light 610. The first array field light 506 may be located at a front end of the vehicle 600. The second array field light 608 may be located on the cab 602, whereas the third array field light 610 may be located on one or both sides of the vehicle 600. Another array field light (not shown) may be located on a rear of the cab 602 or vehicle 600.

In the embodiment of FIG. 6, the work vehicle 600 is being controlled to travel in the forward travel direction 616 where it is to be stored in a barn 612 or other building. The barn 612 may include one or more doors 614 which cover an opening that have a height, HD. As the work vehicle approaches the one or more doors 614, the lighting system of the work vehicle 600 may be designed to communicate the maximum height of the vehicle or tractor, $H_T$, in such a way that the operator can determine if the vehicle 600 will fit through an opening in the barn 612. As shown, one of the array field lights (the second array field light 608 in FIG. 6) projects a light emission 610 corresponding to the maximum height. At least in this example, the vehicle height is greater than the opening, and therefore the operator knows that the vehicle will not fit through the opening. Similarly, the embodiment of FIG. 5 may be utilized to determine if the width of the vehicle or implement may fit through the width of the opening.

While the second array field light 608 is shown in FIG. 6 as projecting this light emission 610, in other embodiments any of the array field lights on the work vehicle 600 may project the light emission. For instance, the first array field light 606 or the third array field light 610 may project light emissions corresponding to the height of the work vehicle 600. In yet another embodiment, an implement lighting system (if applicable) may project the light emission corresponding to the height thereof.

In any of the aforementioned embodiments, the array field lights may project the light emission 610 forward, i.e., in the forward travel direction 616, so that an operator positioned in the cab 602 is able to identify from the light emission 610 the height of the work vehicle 600. Thus, if the operator has to control the work vehicle and/or implement through the opening in the barn 612 or other building, the operator will know the maximum height of the vehicle or implement to determine if the opening is tall enough.

Although not shown in FIG. 6, a proximity sensor such as the sensors 118, 120 in FIG. 1 or a camera such as the camera 116 of FIG. 1 may be used to detect the maximum height of the work vehicle 600. The sensors or camera may communicate this to the controller 222, which in turn may communicate the height to the light control module 224. The light control module 224 may then operably control one or more of the array field lights on the work vehicle to project the light emission 610 of FIG. 6.

Further, in another embodiment, the actual height of the work vehicle 600 may be known and either manually input by the operator or stored in a memory unit of the controller 222. In this embodiment, sensors or a camera may not be necessary for determining the height of the work vehicle 600.

In FIGS. 5 and 6, the light control module 224 of the vehicle or implement lighting system may receive communications from the controller 222 and operably control individual pixel segments to project or display light emissions corresponding to the height and/or width of the vehicle or implement.

In one aspect of this disclosure, the light control module 224 may adjust the light intensity such as dimming the individual lights or increasing the luminosity, particularly if using white lights or using the white color spectrum.

In this disclosure, LED technology is covered but is not intended to be limiting. Other lighting technologies may be used as well including laser, DLP, a combination of LED and other, etc. Each light may be an array field light or light source.

In this disclosure, a plurality of sensing device technologies are described including proximity sensors and camera-based technology. Other sensing technologies such as LIDAR, infrared, radar, etc. may also be used.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural work vehicle for operating in a field, comprising:
    a chassis;
    a cab mounted to the chassis and including a work space for an operator to control the work vehicle;
    a controller for controlling operation of the work vehicle;
    a lighting system of the work vehicle comprising at least one array field light;
    a light control module disposed in electrical communication with the controller, the light control module configured to operably control the at least one array field light;
    a sensor for detecting an object along an intended path of travel of the work vehicle;
    wherein, the controller transmits a signal to the light control module indicative of the intended path of travel;
    wherein, the at least one array field light projects a light emission corresponding to the intended path of travel onto the field at a location visible to the operator while operating the work vehicle;
    wherein, the controller receives a signal from the sensor indicative of the object and communicates an alternative path of travel to the light control module to avoid the object, the alternative path of travel being different from the intended path of travel; and
    wherein, the at least one array field light projects a different light emission corresponding to the alternative path of travel.

2. The work vehicle of claim 1, wherein the at least one array field light comprises a high-definition pixel LED lighting module.

3. The work vehicle of claim 1, wherein the controller receives an input from an operator control indicative of the intended path of travel, the at least one array field light projecting a signal corresponding to the intended path of travel.

4. The work vehicle of claim 3, wherein the signal corresponds to a dashed line of a path to be followed by the work vehicle.

5. The work vehicle of claim 1, wherein the light emission comprises a color indicative of an acceleration, deceleration or stopping of the work vehicle.

6. The work vehicle of claim 1, wherein the light emission comprises a flashing light.

7. The work vehicle of claim 1, wherein the light emission comprises a symbol indicative of a direction corresponding to the intended path of travel of the work vehicle.

8. The work vehicle of claim 1, wherein the lighting system comprises a plurality of array field lights, where the light control module operably controls each of the plurality of array field lights to project the light emission corresponding to the intended path of travel onto the field.

9. An agricultural work vehicle for operating in a field, comprising:
    a chassis;
    a cab mounted to the chassis and including a work space for an operator to control the work vehicle;
    a controller for controlling operation of the work vehicle;
    a lighting system of the work vehicle comprising at least one array field light;
    a light control module disposed in electrical communication with the controller, the light control module configured to operably control the at least one array field light;
    a field map input disposed in communication with the controller, the field map input providing a layout of the field;
    wherein, the controller transmits a signal to the light control module indicative of an intended path of travel of the work vehicle; and
    wherein, the at least one array field light projects a light emission corresponding to the intended path of travel onto the field at a location visible to the operator while operating the work vehicle based on the field map input.

10. The work vehicle of claim 1, wherein the at least one array field light comprises a first array field light and a second array field light;
    further wherein, the light control module selectively operates either the first or second array field light to project the light emission onto the field.

11. The work vehicle of claim 1, wherein the at least one array field light comprises a first array field light and a second array field light;
    further wherein, the light control module selectively operates both the first and second array field lights to project the light emission simultaneously onto the field.

12. The work vehicle of claim 9, further comprising a sensor for detecting an object along the intended path of travel;
    wherein, the controller receives a signal from the sensor indicative of the object and communicates an alternative path of travel to the light control module to avoid the object, the alternative path of travel being different from the intended path of travel;

wherein, the at least one array field light projects a different light emission corresponding to the alternative path of travel.

13. A work vehicle assembly for operating in a field, comprising:
    a work vehicle having a work vehicle width and including: a chassis having a front end, a rear end, a first side and a second side and a cab mounted to the chassis, the cab including a work space for an operator to control the work vehicle;
    a row crop implement for working in the field, the row crop implement having a row crop implement width;
    a controller for controlling operation of the work vehicle;
    a device for detecting the work vehicle width and the row crop implement width, the device being in communication with the controller;
    a lighting system of the work vehicle comprising at least one array field light;
    a light control module disposed in electrical communication with the controller, the light control module configured to operably control the at least one array field light;
    wherein, the controller transmits a signal to the light control module corresponding to the greater of the work vehicle width and the row crop implement width;
    wherein, if the row crop implement width is greater than the work vehicle width, the at least one array field light projects a light emission corresponding to the row crop implement width onto the field in alignment with a first row of the field worked by the row crop implement to prevent overlap between the first row of the field and a second row of the field that is being worked by the row crop implement and in a direction visible to the operator when positioned in the cab.

14. The work vehicle of claim 13, wherein the device comprises a proximity sensor or camera.

15. The work vehicle of claim 13, wherein the maximum dimension comprises a height or width of the work vehicle.

16. The work vehicle of claim 13, wherein the at least one array field light comprises a plurality of array field lights, each of the plurality of array field lights configured to project the light emission.

17. The work vehicle of claim 13, further comprising an implement lighting system including a first array field light, wherein the first array field light projects a second light emission corresponding to the row crop implement width.

18. The work vehicle of claim 9, wherein the light emission comprises a symbol indicative of a direction corresponding to the intended path of travel of the work vehicle.

19. The work vehicle of claim 9, wherein the at least one array field light comprises a first array field light and a second array field light;
    further wherein, the light control module selectively operates either the first or second array field light to project the light emission onto the field.

20. The work vehicle of claim 9, wherein the at least one array field light comprises a first array field light and a second array field light;
    further wherein, the light control module selectively operates both the first and second array field lights to project the light emission simultaneously onto the field.

* * * * *